No. 12,160. REISSUED OCT. 13, 1903.

J. H. GRAY.

GOLD SAVING APPARATUS FOR DREDGING MACHINES.

APPLICATION FILED APR. 23, 1903.

2 SHEETS—SHEET 1.

WITNESSES.

Wm. F. Doyle

R. A. Russ

INVENTOR

James H. Gray

BY

Francis M. Wright

Attorney

No. 12,160. REISSUED OCT. 13, 1903.
J. H. GRAY.
GOLD SAVING APPARATUS FOR DREDGING MACHINES.
APPLICATION FILED APR. 28, 1903.
2 SHEETS—SHEET 2.
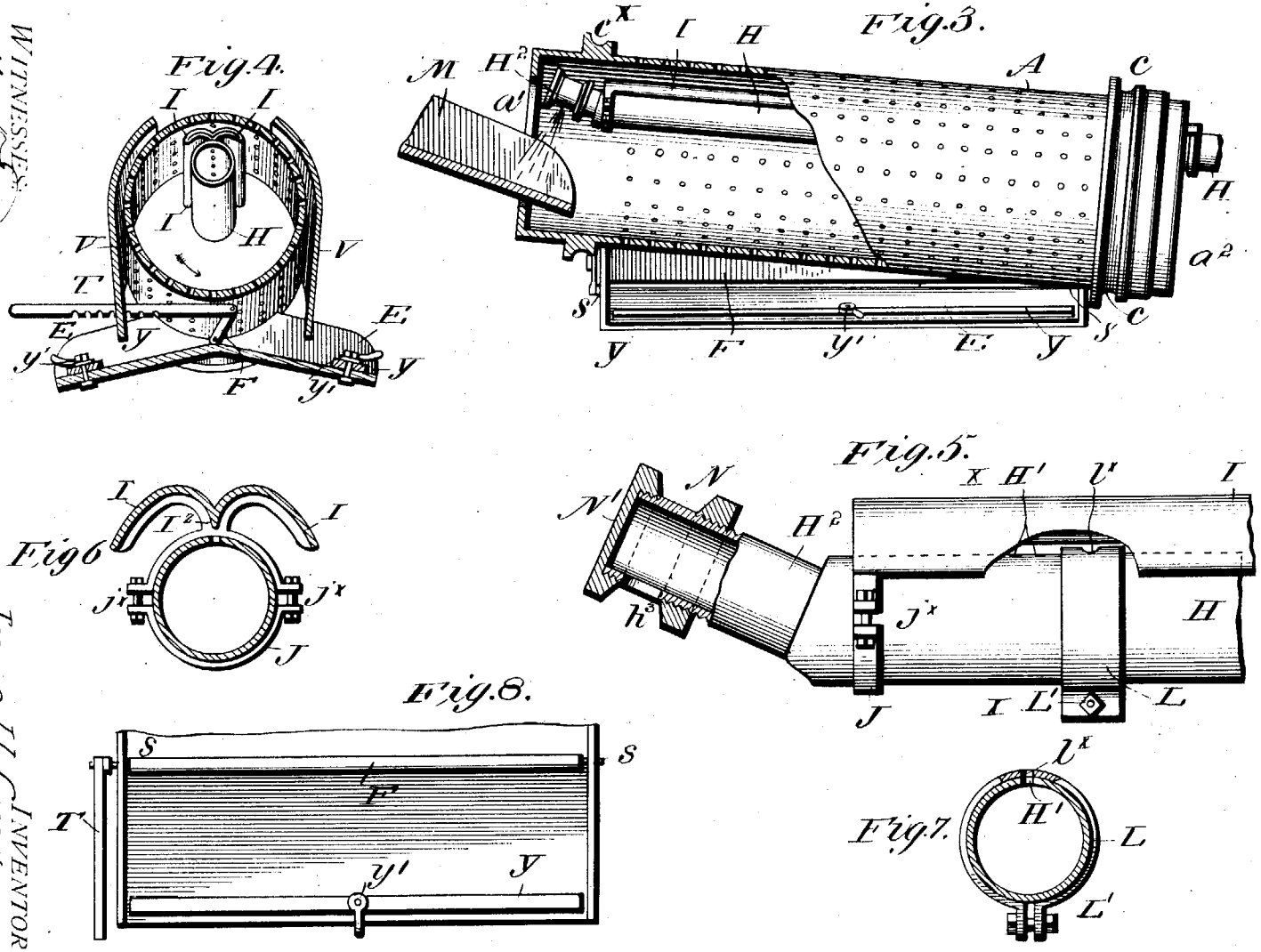
WITNESSES:
Wm. F. Doyle
R. A. Russ
INVENTOR
James H. Gray
BY
Francis M. Wright
Attorney No. 12,160. Reissued October 13, 1903.

UNITED STATES PATENT OFFICE.

JAMES H. GRAY, OF SAN FRANCISCO, CALIFORNIA.

GOLD-SAVING APPARATUS FOR DREDGING-MACHINES.

SPECIFICATION forming part of Reissued Letters Patent No. 12,160, dated October 13, 1903.

Original No. 719,582, dated February 3, 1903. Application for reissue filed April 28, 1903. Serial No. 154,729.

*To all whom it may concern:*

Be it known that I, JAMES H. GRAY, a citizen of the United States, and a resident of San Francisco, in the county of San Francisco and State of California, have invented new and useful Improvements in Gold-Saving Apparatus for Dredging-Machines, of which the following is a specification.

This invention relates to improvements made in gold-separating apparatus of the kind that is employed more especially for separating gold from the material raised and handled by gold-dredging machines, such apparatus consisting chiefly of a screen to remove the rocks and coarser material and gold-saving tables or sluices to eliminate the sand and other refuse material not removed by the screen. In connection with the usual appliances for dredging and elevating the gold-bearing material these parts are mounted in a framework on the deck of a dredger, and as fast as the material is raised it is fed to and passed through the apparatus to extract the valuable mineral particles.

The present improvements in apparatus of this kind or description comprise certain novel construction and combination of screen, gold-saving tables or sluices, and water-distributing appliances, together with means for regulating the distribution of the material on the tables or sluices and means for adjusting the inclination of the tables while in operation and for raising and lowering the same to facilitate cleaning.

The following description particularly explains the nature of my improvements and the manner in which I proceed to construct, apply, and carry out the same, reference being had to the drawings that accompany and form part of this specification.

Figure 2:
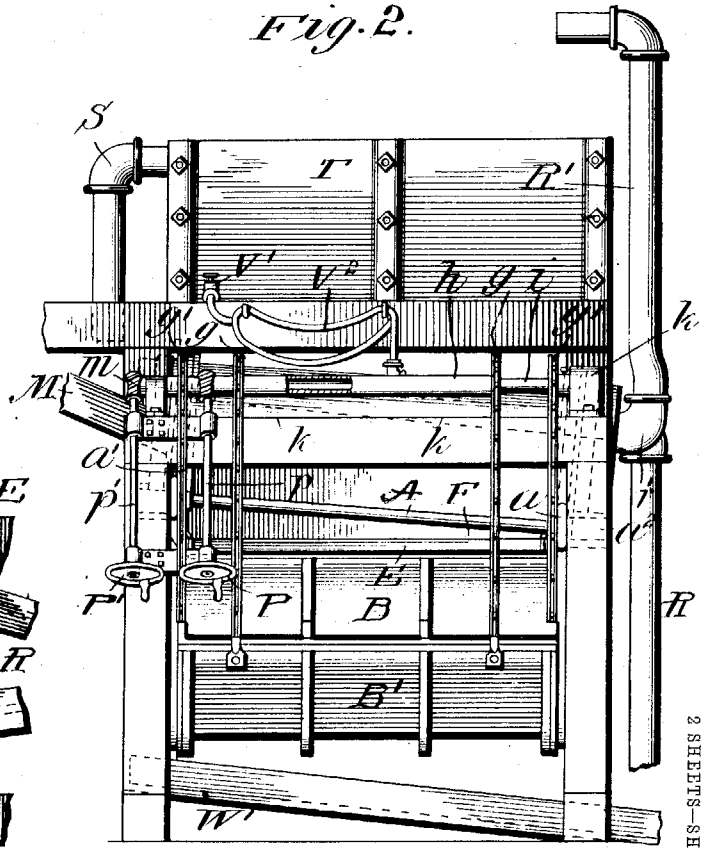
Figure 1:
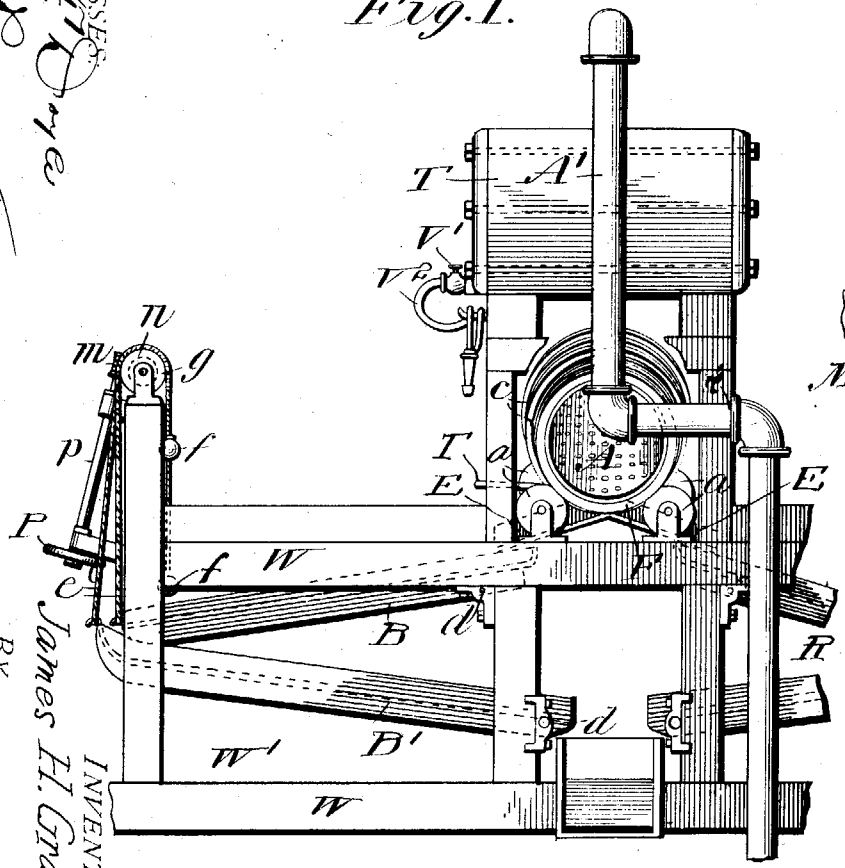

Figure 1 of the drawings is a rear end elevation of the apparatus, showing portions of the supporting-frame, revolving screen-tank, and inclined tables, those on the right-hand side being broken, as they are identical in construction and arrangement with those on the left. Fig. 2 is an elevation taken from the left-hand side of Fig. 1, showing the overflow-tank and the devices for raising and lowering the tables. Fig. 3 is a side view, partly in longitudinal section, of the revolving screen, the adjustable pivoted gate, the swinging bar for regulating the distribution of the material to the inclined tables, and the water-distributing pipes. Fig. 4 is a transverse sectional view of the revolving screen, inclined apron under the screen for catching and distributing the screened material to the tables, the pivoted swinging gate, and the adjustable bars to spread or distribute the material evenly on the inclined tables, the section being taken through $x\,y$, Fig. 3. Fig. 5 is a detail view, partly in longitudinal section, of the higher end portion of the water-distributing pipe in the revolving screen, showing the arrangement of the holes in the water-pipe, the deflector above the pipe, and the means for regulating the area of the outlets for discharging the water. Fig. 6 is a cross-section through the water-pipe, showing the curved deflectors for throwing the water downward upon the material in the screen. Fig. 7 is a transverse section through the water-distributing pipe, taken at $x\,x$, Fig. 5, showing the adjustable band for regulating the flow of water. Fig. 8 is a top view of the inclined apron.

The screen A is of the cylindrical kind, mounted on wheels or rollers $a\,a$ and caused to revolve by power applied to the shafts or axles of the rollers. The cylinder has an inclination from the horizontal to cause the material to travel from the higher or feeding-in end $a'$ to the lower or discharge end $a^2$, and the body of the cylinder is pierced with holes of proper size to pass the gold and fine portion of the material. The holes of this screening-surface should be of uniform size for the entire length of the cylinder between the bearing-rings $c$, that rest on the carrying-wheels $a$, so that the material discharged through the screen shall be as nearly as practicable of a uniform grade of coarseness.

B B′ are gold-saving tables suspended in the frame below the screen and adjustable at varying angles of inclination to regulate the flow of the gold-bearing material and water over their surfaces, as well as to facilitate the operation of washing and cleaning up. The tables are hung at one end on pivots $d\,d$ and are suspended by chains $e\,e$, attached to the opposite ends and running over sprockets $g$ $g'$ on overhead winding-shafts $h$ $i$. On the ends of the chains are weights $f$ $f$ to take up the slack of the free ends of the chains, and each winding-shaft is connected by a worm and worm-wheel $m$ to a shaft provided with a hand-wheel for turning it. The lower table is raised and lowered from the outer end by the hand-wheel P, the shaft $p$ of which is geared into the hollow shaft $h$, carrying the sprocket-wheels, while the upper table is handled in the same manner by the outside wheel P', the shaft $p'$ of which is connected with the solid shaft $i$, that runs through the shaft $h$. On the surfaces of these tables are placed any kind of gold-saving devices, such as amalgamating-plates, riffles, grating, matting, or any known device to catch the gold particles. In the operation of cleaning up the tables the gold-saving devices on the upper table are taken up and washed, and after the table-surface is washed down the table is raised by means of its hand-wheel to give access to the lower table, which can be let down in like manner on the deck of the boat.

E is an inclined apron fixed in a slanting position under the cylindrical screen and extending from beneath the longitudinal middle line of the cylindrical body outwardly to the inner end of the upper table B, over which it projects. Extending under the cylinder for the full length of its perforated surface this apron covers the intervening space between the screen and the upper table.

F is a gate hung on pivots $s$ $s$ beneath the cylinder, filling the angular space between the ridge of the apron and the cylinder-body directly above and capable of being set to an angular position more or less out of the vertical. From the ridge on which this gate is situated the apron E, sloping in opposite directions to the right and left, is arranged to distribute the material from the cylinder to two sets of tables B B', of which the set on the right-hand side (omitted from the drawings) is identical in construction and operation with the tables B B'. (Shown in Figs. 1 and 2.)

The function of the gate F, that divides one side of the apron E from the other, is to distribute as equally as practicable the screened material between the two sets of tables, for which purpose it is capable of being set at varying angles to catch the excess of material that is discharged through the holes beyond the center on the leading side of the perforated body and direct the same to the surface of the stationary apron on the opposite side, which materially would receive a less quantity of the material if the gate were omitted or if it occupied a vertical position upon the ridge of the apron.

If the lower side of the screen be taken to revolve contra-clockwise, as indicated by the arrow, Fig. 4, the material being acted on will naturally be carried by the centrifugal force beyond the lowest central line of the screen-cylinder and will be discharged through the perforated surface to the right of that center in greater quantity than it will be discharged through the perforations on the opposite side; but by setting the gate F at an angle toward the right or leading side of the cylinder the material can be quite equally divided between the two sets of tables. A bar with notches on its lower edge, attached at one end to the gate by a loose joint and extending through a slot in the stationary shield or casing V, serves for setting the gate. The notched edge catching on the bottom edge of the slot in the casing locks the gate in position after being set. The distribution of the material from the end of the apron upon the upper table is further controlled and equalized by an adjustable fence composed of a bar Y, extending across the end of the apron, to which it is attached by a bolt $y'$, so as to be capable of angular presentation to the stream of material flowing down the apron. By varying this angle as the condition and quantity of the material discharged upon the apron are found to vary from time to time the flow of the material from the apron is regulated and its distribution across the table is kept uniform at all points.

H is a water-distributing pipe extending through the upper part of the cylinder longitudinally from end to end and having apertures H' along the top side, through which water is discharged in a number of streams or jets into the surrounding cylinder-space. One end of the pipe H is connected by an elbow $r'$ with a pipe R, leading from a suitable supply of water under pressure, such as a pump on the dredger. The other end of the pipe is formed of an upwardly-inclined section of pipe $H^2$, standing at an angle sufficiently elevated to clear the mass of material on the feeding-in chute M and having a discharge-opening $h^3$ in the lower side in position to discharge a stream of water directly upon the chute below. The size of this outlet $h^3$ is increased or reduced, as the conditions of work may require, by means of a screw-threaded band or ring N, working on a threaded portion of the pipe, as shown in the detail Fig. 3. The end of the pipe $H^2$ is closed by a screw-cap N', that may be removed to give access to the perforated pipe for cleaning it. The function of this nozzle or extension $H^2$ is to deliver a considerable quantity of water directly upon the material at its entrance to the cylinder, thereby saturating it and facilitating its onward movement. The outlet-holes H' are located on the upper side of the pipe H in order to prevent these apertures from being choked or closed by pebbles or coarse gravel and other obstructions that are frequently taken in by the supply-pump and carried into the pipe H. By this arrangement all such matter taken into the pipe H by the water will be carried along the bottom of the pipe and be discharged through the outlet $h^3$ upon the chute.

L is an annular clasp or split band encircling the pipe H and secured in place therein by a bolt and nut L′, uniting the ends of the band, so as to clamp it on the pipe and at the same time allow the band to be shifted along the pipe, so as to cover or uncover one or more of the water-outlets H′. A hole $l^{\times}$ in the upper side of this band is set to register with the hole H′ in the pipe when the full area of that aperture is desired, or by turning the band on the pipe it is set to partly or entirely close and shut off the aperture H′. Usually the band is made of sufficient width to cover two holes, so as to make the same band close one or two holes, according to its position on the pipe, and with several bands placed at required intervals the quantity of water distributed is readily increased or reduced at different points throughout the length of the screen as the character or the condition of the material may be found to require.

R′ is a stand-pipe having a common connection through the elbow $r'$ with the supply-pipe R and the pipe H. The open top end of this stand-pipe is situated above a storage-tank T on the frame, so as to deliver the surplus water into that receptacle.

The overflow stand-pipe R, while it maintains uniform head or pressure in the perforated distributing-pipe, also removes unnecessary back pressure on the pump and in connection with the storage-tank furnishes a supply of water at hand for use in cleaning up the tables, for washing down the decks, or for supplying water to the boiler when steam-power is used. An outlet on the side of the tank fitted with a stop-cock V′, having a coupling for attaching a hose $V^2$, furnishes ready means of washing off the tables.

I indicates a deflector having oppositely-curved wings springing from a common support composed of a clamp J, embracing the pipe H and secured therein by bolts and nuts $j^{\times}$. The wings extending to the right and left over the tops of the pipe spring in opposite directions in a smooth curve from a central line situated directly over the line of outlet-holes $H^2$, dividing the upwardly-discharged streams into equal portions and deflecting the portions to the right and left downwardly upon the material. By setting the central dividing edge $I^2$ to the right or left of the center, which is done by loosening the clamp J, the quantity of water deflected to one side of the cylinder can be increased over that discharged to the other side. Such adjustment will be found necessary in some cases, owing to the tendency of the material in the cylinder to be carried by the revolving motion more to one side than to the other of the perforated lower portion of the cylinder. Covering the sides of the cylinder are stationary shields V to catch and discharge on the aprons below whatever water and material may find outlet through the perforated sides of the cylinder.

In the operation of the apparatus as thus constructed the gold-bearing gravel or other material is fed to the chute M, where it is saturated with water from the pipe $H^2$ and, passing into the cylinder, is subjected to the operation of that part of the apparatus, the material too coarse to pass through the screen being discharged at the lower end $a^2$. The finer material discharged with the water upon the aprons is divided about equally therein by the gate and is distributed thereby to the two sets of separating-tables on opposite sides of the cylinder.

The pivoted equalizing-bar on each apron is set at proper angle to the flow of the material to distribute the same equally across the upper end of the top table. After passing over the two tables the material is discharged from the lower end of the bottom table into a sluice-box, which may also be supplied with gold-saving devices.

The overflow from the storage-tank is carried off by a pipe S.

Having thus fully described my invention, what I claim as new therein, and desire to secure by Letters Patent, is—

1. The combination with the revoluble cylindrical screen, of a plurality of aprons beneath the screen having inclination laterally outward in opposite directions from a ridge situated longitudinally under the center of the screen, an equalizing-bar on the lower end of each of the aprons, an adjustable gate between the ridge and the bottom of the screen, and means for setting and holding the gate at varying angles in either direction from its central position.

2. The combination with the revoluble cylindrical screen, of the stationary water-distributing pipe having outlet-apertures along its upper side, and a relatively narrow slidable band adapted by adjustment to control one or more of the outlet-apertures at a given point along the length of the pipe.

3. The combination with the revoluble cylindrical screen, of a stationary water-distributing pipe having outlet-apertures along the upper side, and a band rotatable and slidable longitudinally on the pipe and having an aperture which by adjustment of the band is set into or out of line with a given one of the outlet-apertures in the stationary pipe.

4. The combination, with the revoluble cylindrical screen, of a water-distributing pipe having an upwardly-set angular nozzle on the end provided with an outlet-aperture in the lower side, and a longitudinally-adjustable collar on said nozzle to vary the size of the outlet-aperture.

5. The combination with the revoluble screen, of a stationary water-distributing pipe having outlet-apertures along its upper side and the adjustable deflector composed of curved deflecting-surfaces springing laterally in opposite directions above the top of the pipe from a common center line, and means for adjusting the said center line of the deflectors to one side or the other of the center of the pipe.

6. In combination with the upper and lower gold-saving tables pivoted at their inner ends and inclining in opposite directions, the chains attached to said tables at their free ends, the sprocket-wheels around which said chains are passed, the counterbalance-weights on the opposite ends of said chains, the hollow shaft upon which the sprocket-wheels for operating one of the tables are mounted, the shaft in said hollow shaft upon which the sprocket-wheels for operating the other table are mounted, the worm-wheels on said shafts, the worms gearing with said worm-wheels, and the shafts for turning said worms.

7. In an apparatus of the character described, the combination of the horizontal shafts one within the other, the wheels on said shafts, the chains around said wheels, the tables supported by said chains at one end and pivoted at the opposite ends, and means for turning said shafts.

JAMES H. GRAY.

Witnesses:
FRANCES M. WRIGHT,
BESSIE GORFINKEL.